Figure 1:
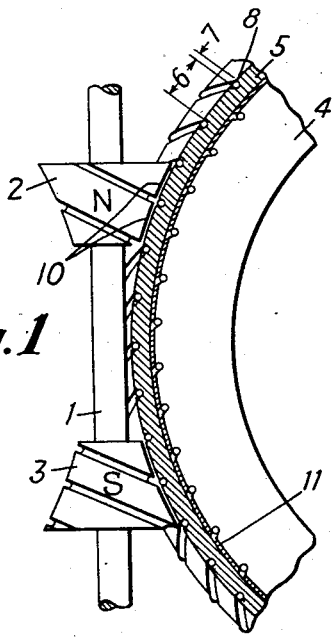

Feb. 13, 1945. M. MORRISON 2,369,599
SOUND REPRODUCER DRIVE
Filed Nov. 9, 1943

INVENTOR.

Patented Feb. 13, 1945

2,369,599

UNITED STATES PATENT OFFICE 2,369,599

SOUND REPRODUCER DRIVE

Montford Morrison, Upper Montclair, N. J.

Application November 9, 1943, Serial No. 509,569

3 Claims. (Cl. 172—284)

This invention relates to magnetic drives, and relates in particular to noiseless dynamo-electric speed-reducers and specifically relates to dynamo-electric drives for sound-reproducers.

Among the objects of the invention are: to provide a magnetic speed-reducer having characteristics of a dynamo-electric machine instead of those of a magnetically coupled set of of gears; to provide a magnetically coupled speed-reducer which possesses a comparatively high slip-speed torque; to provide a magnetically coupled speed-reducer which has a high stalled-torque; and to provide a structure for such devices that operates with an absence of vibration and noise.

In the prior art, magnetic speed-reducers employing worms and wheels have been constructed, but in all cases the teeth of the wheel and the threads of the worm have followed conventional lines in having the worm-wheel teeth equal to, or slightly less than, the tooth space when measured along the addendum circle and the worm has always been made to match this wheel tooth structure, and in so doing, the longitudinal space between the thread has always been made equal to, and never less than, the width of the thread when measured as a tangent to the addendum circle.

In the prior art magnetically driven worm-wheels, the structure of conventional worms and wheels have been employed, by merely turning the worm-wheel down to a diameter slightly below that of the addendum circle and similarly turning the worm down so that there is a few thousandths clearance between the worm and the worm-wheel, but with the conventional equal lengths of teeth and spaces.

Such a structure operates satisfactorily after the worm-wheel has acquired its final speed, providing the loading is uniform and is not sufficient to pull the worm-wheel teeth substantially out of registration with the threads. Where the spaces in the teeth are substantially equal or where the space between the teeth is a substantial portion of the tooth width, both being measured along the addendum circle, the torque between the driven wheel and the driving worm is lost if, and when, the tooth becomes out of registration because the magnetic flux between the thread and the tooth under these circumstances seeks and finds a leakage path, thus reducing the flux useful for producing torque to a comparatively ineffective value.

If, in such a mechanism the wheel to be driven is stalled and the worm is brought up to full speed rapidly, the torque-time factor is not sufficient to start the stalled worm-wheel in many cases where any useful loading is present. With such a structure, the worm has to not only bring the live-load up to speed, but has to supply the kinetic energy required by the inertia of the wheel and connected parts to bring them up to speed.

In the present invention, an important improvement has been made in the reduction of the space between the worm-wheel teeth to a small fraction of the tooth width, both being measured along the addendum circle, and likewise in reducing the space between the worm threads to match this worm-wheel tooth construction. By making the worm-wheel thickness, measure parallel to the axis of its rotor, sufficient to include a large amount of worm thread surface, the magnetic reluctance across the air-gaps is greatly improved and in many cases may be substantially constant, thus providing a substantially constant torque.

Another important improvement in the present invention lies in a structure comprising an electrical winding in or about the teeth of the worm-wheel, providing a dynamo-electric machine characteristic rather than a magnetic worm and wheel characteristic of the prior art. In the present invention, there is provided a spirally-operating continuous-magnetic field-member, in cooperation with a wound or squirrel-cage rotor, resulting in a novel dynamo-electric machine.

Figure 2:
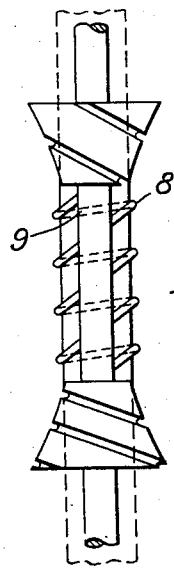
Figure 3:
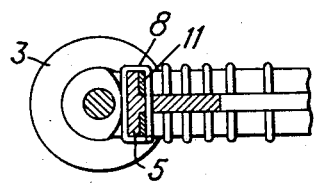

Further and other objects will be pointed out in the reading of the description hereunder, particularly when taken in connection with the drawing in which Fig. 1 is an elevation partially in section of an embodiment of my invention; Fig. 2 is a view of Fig. 1 looking east; and Fig. 3 is a view of Fig. 1 looking north, and partly in section, and taken along a horizontal line half way in between the N-pole and the S-pole of the worm.

Referring to Fig. 1, I is a worm-wheel shaft which is provided with two worm-wheels, 2 and 3. Shaft I may be a high permeability permanent magnet onto which worms 2 and 3 are pressed, worms 2 and 3 being a high permeability soft alloy, or the entire assembly including members I, 2 and 3 may be cast integrally of a high permeability permanent magnet alloy with the worm faces being trued with the shaft, as is understood by those skilled in the art. Obviously direct current field excitation may also be employed, if and when desired.

The worm assembly as shown, provides a complete permanent-magnet circuit within itself, though if desired, the permanent magnet field can be supplied from a stationary external magnet.

The element 4 is a sector of a worm-wheel which may have a laminated structure to reduce eddy current losses, or may be solid, and for simplicity in teaching the invention, this sector will be described as of a solid form. In Fig. 1, the section shown at 5 is cut through the wheel in a plane which passes through the axis of shaft 1. The tooth length measured along the addendum circle is indicated by the dimension 6 and the spaces between the teeth are indicated by the dimension conventionally indicated at 7.

The tooth spaces may be deep or shallow and may have embedded in them a copper conductor 8 which is wound around the rotor magnetic path and soldered to form a squirrel-cage winding. The position of this winding is better understood by reference to Fig. 2 which shows the conductor 8 lying in a diagonal slot and threaded through and behind the magnetic material indicated by the dotted lines 9.

Obviously a straight squirrel-cage may be punched from a copper ribbon and laid in the slot if and when desired. A wound rotor may be also employed, if desired.

Referring to Fig. 1, the magnetically active face of the threads of the worm are formed to match the worm-wheel teeth, as indicated at 10, and likewise then may the spaces between the threads of the worm, be formed to match the teeth of the worm-wheel.

In the embodiment shown, the worm and wheel, is illustrated as having a double thread instead of a single one, which has some advantages in operating characteristics.

Referring to Fig. 3, the conductor 8 encircles the magnetic material 5 and in some cases a copper strip 11 may be inserted so that conductor 8 will have a low-resistance short-circuit path in the case of a squirrel-cage structure.

The embodiment above disclosed, it will be appreciated by those skilled in the art, is more closely related to a squirrel-cage motor than to a worm and wheel magnetic drive, in that the embodiment employs a squirrel-cage or otherwise wound rotor very similar to that employed in alternating motors, but the revolving field of the alternating current motor is replaced by a field which progresses angularly with reference to the axis of the motor by virtue of the rotary motion of the shaft 1 which, as it turns (for short distances), pulls the field across the periphery of the rotor, in a manner very similar to that experienced by a polyphase alternating-current wound-stator, with the exception that in the case of the wound stator, the field revolves continuously and at a constant magnitude around the axis of the rotor completely through the whole 360°, whereas in the present invention, the field revolves about the axis of the rotor but only over short distances thereof. It may be said to progress about the axis of the rotor as well as to revolve about it.

Attention is directed to the fact that in the polyphase alternating current motor-stator with a distributed winding, the revolving field is constant in magnitude and in polarity. In the present invention, this is true for short distances along the periphery of the rotor.

In the operation device, the rotor 4 may be stalled and the higher the speed of the shaft 1, greater torque is produced between the worm producing the continuous magnetic field and the rotor, so that the device starts up much like a polyphase alternating-current motor with a squirrel-cage or otherwise wound rotor.

The principal difference being that the apparatus efficiency of the rotor in the present invention is, of course, not up to that of a conventional type motor because of the small percentage of active iron in use in the rotor of the present invention at any instant of time.

This device, however, is not intended to produce large amounts of torque and is particularly suited to devices where quietness of operation and noiselessness are more desirable than high apparatus efficiency.

It is obvious that other embodiments and modifications may be made of the present invention, the worms 2 and 3 may be in many cases more advantageously operated closer together and in some cases three or even five worms may be advantageously used, thus increasing the amount of active iron in the rotor and thereby bringing up the apparatus efficiency of the device.

The above structure shows but one embodiment of the present invention, and with the teachings herein given, other and further embodiments may be made by those skilled in the art to which the invention appertains, and the scope thereof is set forth in the claims hereunder.

What I claim is:

1. A magnetically coupled worm and wheel speed-reducer, comprising a peripherally toothed magnetizable wheel having spaces between the teeth of said wheel dimensionally less than the circumferential width of said teeth, said wheel having a squirrel-cage electrical winding fixed about said teeth, a threaded tangential magnetizable worm having its magnetically cooperating surface-of-revolution formed to match the peripheral surface of said wheel and free to rotate out of contact with said wheel, the spaces between the threads of said worm being less than the thread width, and a magnetic member providing a magnetic circuit with said worm and said wheel.

2. A magnetically coupled worm and wheel speed-reducer, comprising a magnetizable wheel having its rim slotted to form the magnetic core of an alternating-current induction motor rotor, the peripheral openings in the slots of said rotor being less than the circumferential width of the intervening tooth faces, a squirrel-cage winding provided in said slots, a threaded magnetized tangential worm having its magnetically cooperating surface-of-revolution formed to match the toothed peripheral surface of said wheel, and said worm being free to rotate out of contact with said wheel and magnetically coupled thereto.

3. A magnetically coupled worm and wheel speed-reducer, comprising a magnetizable wheel having its rim slotted to form the magnetic core of an alternating-current induction motor rotor, the peripheral openings in the slots of said rotor being less than the circumferential width of the intervening tooth faces, the slots of said rotor being provided with a squirrel-cage winding, and a magnetized threaded worm tangentially positioned out of contact with said wheel and adapted to induce current in said winding under rotation of said worm.

MONTFORD MORRISON.